United States Patent
Fu et al.

(10) Patent No.: US 11,677,652 B2
(45) Date of Patent: *Jun. 13, 2023

(54) PORT ADAPTATION METHOD AND DEVICE

(71) Applicant: Huawei Technologies Co., Ltd., Shenzhen (CN)

(72) Inventors: Shiyong Fu, Shenzhen (CN); Yan Zhuang, Nanjing (CN); Rui Hua, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/356,276

(22) Filed: Jun. 23, 2021

(65) Prior Publication Data

US 2021/0392066 A1    Dec. 16, 2021

Related U.S. Application Data

(63) Continuation of application No. 16/113,102, filed on Aug. 27, 2018, now Pat. No. 11,082,322.

(30) Foreign Application Priority Data

Aug. 28, 2017   (CN) .......................... 201710750334.4

(51) Int. Cl.
*H04L 43/12*    (2022.01)
*H04L 12/10*    (2006.01)
*H04L 12/40*    (2006.01)

(52) U.S. Cl.
CPC .............. *H04L 43/12* (2013.01); *H04L 12/10* (2013.01); *H04L 12/40045* (2013.01)

(58) Field of Classification Search
CPC .... H04L 43/12; H04L 12/10; H04L 12/40045
See application file for complete search history.

(56) References Cited

U.S. PATENT DOCUMENTS

| | | | |
|---|---|---|---|
| 2006/0089230 A1* | 4/2006 | Biederman | G06F 1/266 477/34 |
| 2009/0031152 A1 | 1/2009 | Bolderl-Ermel et al. | |
| 2010/0231054 A1 | 9/2010 | Togawa | |
| 2014/0115354 A1 | 4/2014 | Jabbaz et al. | |
| 2014/0250327 A1* | 9/2014 | Flynn | G06F 1/30 714/22 |
| 2015/0323968 A1* | 11/2015 | Chong | H04L 12/10 713/300 |

(Continued)

FOREIGN PATENT DOCUMENTS

| | | |
|---|---|---|
| CN | 101834727 A | 9/2010 |
| CN | 102957542 A | 3/2013 |

(Continued)

*Primary Examiner* — Henry Tsai
*Assistant Examiner* — Harry Z Wang
(74) *Attorney, Agent, or Firm* — Slater Matsil, LLP

(57) ABSTRACT

A port adaptation method applied to a network device including a port adaptation apparatus includes probing whether the first port and the second port are connected to power sourcing equipment, and maintaining or switching one of the first port and the second port that is connected to power sourcing equipment as, or to, a powered state, and a state of the other port as, or to, a powering state.

20 Claims, 5 Drawing Sheets

(56) References Cited

U.S. PATENT DOCUMENTS

| | | | |
|---|---|---|---|
| 2016/0020910 A1* | 1/2016 | Jones | H04L 12/10 |
| | | | 370/218 |
| 2016/0064938 A1* | 3/2016 | Balasubramanian | H04L 12/10 |
| | | | 307/11 |
| 2016/0087807 A1 | 3/2016 | Chen et al. | |
| 2017/0041153 A1* | 2/2017 | Picard | H04L 12/10 |
| 2017/0199794 A1* | 7/2017 | Byers | G06F 1/263 |
| 2017/0357300 A1 | 12/2017 | Chong et al. | |
| 2018/0167223 A1* | 6/2018 | Pratap | H04L 12/10 |
| 2019/0331741 A1* | 10/2019 | Hittel | H04L 43/50 |

FOREIGN PATENT DOCUMENTS

| | | |
|---|---|---|
| CN | 105515787 A | 4/2016 |
| CN | 106410787 A | 2/2017 |
| JP | 2009260407 A | 11/2009 |
| JP | 2010213068 A | 9/2010 |
| JP | 2014230195 A | 12/2014 |
| JP | 2015104288 A | 6/2015 |

* cited by examiner

PORT ADAPTATION METHOD AND DEVICE

CROSS-REFERENCE TO RELATED APPLICATIONS

This application is a continuation of U.S. patent application Ser. No. 16/113,102 filed on Aug. 27, 2018, which claims priority to Chinese Patent Application No. 201710750334.4, filed on Aug. 28, 2017, both of which are hereby incorporated by reference in its entirety.

TECHNICAL FIELD

The present invention relates to the communications field, and in particular, to a port adaptation method and a device.

BACKGROUND

Power over Ethernet (PoE) is a technology for transferring both Ethernet data and power by using a twisted pair. The power refers to supplied electricity as defined in the Institute of Electrical and Electronics Engineers (IEEE) PoE standard, a PoE device includes power sourcing equipment (PSE) and a powered device (PD). The PSE is a device that supplies power. The PD is a device that extracts power.

Currently, some network device serves as both PSE for power supply and a PD for power extraction. For example, a central access point (AP) in a distributed wireless local area network (WLAN) serves as both a PD that extracts power from a switch and PSE that supplies power to a distributed AP. However, whether a PoE port of the central AP is a power sourcing port (also referred to as a power providing port) or a power extraction port (also referred to as a powered port) cannot be distinguished from an appearance of the PoE port. Consequently, a connection error is easily caused.

SUMMARY

This application provides a port adaptation method and apparatus, and a system. A port on a network device may adaptively become a power sourcing port or a power extraction port according to a peer connected device, so that not only device port setting flexibility can be improved, but also a device connection error can be avoided, thereby reducing manual installation costs, and improving network deployment efficiency.

According to a first aspect, a port adaptation method is provided, and is applied to a network device including a port adaptation apparatus, where the port adaptation apparatus includes a power sourcing chip and a powered chip, and the port adaptation apparatus is configured to control a first port and a second port on the network device to connect to the power sourcing chip and the powered chip. The method includes probing, by the network device, whether the first port and the second port are connected to power sourcing equipment, and if it is probed that the first port is connected to power sourcing equipment, maintaining or switching a state of the first port as or to a powered state, and a state of the second port as or to a powering state, and locking the first port as a power extraction port, or if it is probed that the second port is connected to power sourcing equipment, maintaining or switching a state of the second port as or to a powered state, and a state of the first port as or to a powering state, and locking the second port as a power extraction port.

In the foregoing port adaptation method, the network device probes whether the first port and the second port on the network device are connected to power sourcing equipment, and if it is probed that one of the first port and the second port is connected to power sourcing equipment, locks the port as the power extraction port. In this case, the other port serves as a power sourcing port. In this way, one of the first port and the second port on the network device adaptively serves as the power extraction port, and the other port serves as the power sourcing port, so that when a network is deployed, interconnection can succeed without a need to manually distinguish between the power sourcing port and the power extraction port, thereby resolving a problem of device interconnection error, and improving network deployment efficiency.

With reference to the first aspect, in a first possible implementation of the first aspect, if it is probed that the first port is not connected to power sourcing equipment, and the second port is not connected to power sourcing equipment, and there is a power source supplying power to the network device, the network device switches the state of the first port to the powering state, and switches the state of the second port to the powered state, or the network device switches the state of the first port to the powered state, and switches the state of the second port to the powering state.

Alternatively, when the network device sets a switching period, if within the switching period, it is probed that the first port is not connected to the power sourcing equipment, and the second port is not connected to the power sourcing equipment, and there is a power source supplying power to the network device, after the switching period expires, the network device switches the state of the first port to the powering state, and switches the state of the second port to the powered state, or after the switching period expires, the network device switches the state of the first port to the powered state, and switches the state of the second port to the powering state.

In this way, by setting the switching period, a problem that one probing or detection result is inaccurate, or a frequent switching problem caused by a time window during device interconnection can be avoided.

With reference to the first possible implementation of the first aspect, in a second possible implementation of the first aspect, after the switching the state of the first port to the powering state, and switching the state of the second port to the powered state, the method further includes detecting, by the network device, whether the first port is connected to a valid powered device, and probing whether the second port is connected to power sourcing equipment, if it is detected that the first port is connected to a valid powered device, maintaining the state of the first port as the powering state, and the state of the second port as the powered state, and locking the first port as a power sourcing port, and if it is probed that the second port is connected to power sourcing equipment, maintaining the state of the first port as the powering state, and the state of the second port as the powered state, and locking the second port as the power extraction port.

In this way, in an initial phase in which the network is deployed for device interconnection, the state of the port is switched, so that a connection can succeed regardless of which of the first port and the second port is connected to power sourcing equipment and which of the first port and the second port is connected to a powered device, and there is no need to manually distinguish between the power sourcing port and the power extraction port, thereby improving network deployment efficiency.

With reference to the second possible implementation of the first aspect, in a third possible implementation of the first aspect, the method further includes if it is detected that the first port is not connected to a valid powered device, and it is probed that the second port is not connected to power sourcing equipment, switching, by the network device, the state of the first port to the powered state, and switching the state of the second port to the powering state.

Alternatively, when the network device sets the switching period, if within the switching period, it is detected that the first port is not connected to a valid powered device, and it is probed that the second port is not connected to power sourcing equipment, after the switching period expires, the network device switches the state of the first port to the powered state, and switches the state of the second port to the powering state.

With reference to any one of the first to the third possible implementations of the first aspect, in a fourth possible implementation of the first aspect, after the switching the state of the first port to the powered state, and switching the state of the second port to the powering state, the method further includes probing, by the network device, whether the first port is connected to power sourcing equipment, and detecting whether the second port is connected to a valid powered device, if it is probed that the first port is connected to power sourcing equipment, maintaining the state of the first port as the powered state, and the state of the second port as the powering state, and locking the first port as the power extraction port, and if it is detected that the second port is connected to a valid powered device, maintaining the state of the first port as the powered state, and the state of the second port as the powering state, and locking the second port as the power sourcing port.

With reference to the fourth possible implementation of the first aspect, in a fifth possible implementation of the first aspect, the method further includes, if it is probed that the first port is not connected to power sourcing equipment, and it is detected that the second port is not connected to a valid powered device, switching, by the network device, the state of the first port to the powering state, and switching the state of the second port to the powered state.

Alternatively, when the network device sets the switching period, if within the switching period, it is probed that the first port is not connected to power sourcing equipment, and it is detected that the second port is not connected to a valid powered device, after the switching period expires, the network device switches the state of the first port to the powering state, and switches the state of the second port to the powered state.

With reference to any one of the first aspect, or the first to the fifth possible implementations of the first aspect, in a sixth possible implementation of the first aspect, the method further includes, if it is probed that the first port is not connected to power sourcing equipment, and the second port is not connected to power sourcing equipment, and there is no power source supplying power to the network device, continuing, by the network device, to probe whether the first port and the second port are connected to power sourcing equipment.

With reference to any one of the first aspect or the foregoing possible implementations, after the first port and/or the second port are/is locked, the first port and the second port are unlocked if an exception occurs in the network device, for example, an entire system or some components of the network device are faulty or a power supplying status of the PoE device 10 changes (from having a power supply for supplying power to having no power supply for supplying power). Alternatively, the first port and/or the second port are/is unlocked if a device connected to the port changes (for example, is faulty or is disconnected). After both the first port and the second port are unlocked, the first aspect and the possible implementations of the first aspect are re-performed.

In this way, in a network scenario in which a device interconnected with the network device frequently changes, there is no need to manually distinguish between the ports, and one of the first port and the second port may adaptively serve as the power extraction port and the other port serves as the power sourcing port, thereby improving network maintenance efficiency.

According to a second aspect, a port adaptation apparatus is provided, and is applied to a network device. The port adaptation apparatus includes a power sourcing chip, a powered chip, and an adaptive module, where the power sourcing chip is connected to the adaptive module, the powered chip is connected to the adaptive module, the adaptive module is connected to a first port and a second port on the network device, and the adaptive module is configured to probe whether the first port and the second port are connected to power sourcing equipment, and if it is probed that the first port is connected to power sourcing equipment, maintain or switch a state of the first port as or to a powered state, and a state of the second port as or to a powering state, and lock the first port as a power extraction port, or if it is probed that the second port is connected to power sourcing equipment, maintain or switch a state of the second port as or to a powered state, and a state of the first port as or to a powering state, and lock the second port as a power extraction port.

According to the network device provided in this application, the first port and the second port on the network device are used as a port group, and a power sourcing chip and a powered chip are disposed for the port group, so that according to connected devices, one of the first port and the second port can adaptively serve as the power extraction port, and the other port serves as a power sourcing port. In this way, during device interconnection, there is no need to manually distinguish between the power sourcing port and the power extraction port, thereby reducing labor costs and a connection error rate, and improving network deployment efficiency.

With reference to the second aspect, in a first possible implementation of the second aspect, the adaptive module is further configured to, if it is probed that the first port is not connected to power sourcing equipment, and the second port is not connected to power sourcing equipment, and there is a power source supplying power to the network device, switch the state of the first port to the powering state, and switch the state of the second port to the powered state, or switch the state of the first port to the powered state, and switch the state of the second port to the powering state.

Alternatively, when the network device sets a switching period, the adaptive module is further configured to, if within the switching period, it is probed that the first port is not connected to power sourcing equipment, and the second port is not connected to the power sourcing equipment, and there is a power source supplying power to the network device, after the switching period expires, switch the state of the first port to the powering state, and switch the state of the second port to the powered state, or switch the state of the first port to the powered state, and switch the state of the second port to the powering state.

In this way, by setting the switching period, a problem that one probing or detection result is inaccurate, or overheads caused by frequent switching during device interconnection can be avoided.

With reference to the second aspect or the first possible implementation of the second aspect, in a second possible implementation of the second aspect, when there is the power source supplying power to the network device, the state of the first port is the powering state, and the state of the second port is the powered state, the power sourcing chip is configured to detect whether the first port is connected to a valid powered device, and feed back a detection result of the first port to the adaptive module, and the adaptive module is further configured to probe whether the second port is connected to power sourcing equipment, and receive the detection result of the first port that is fed back by the power sourcing chip, if the detection result of the first port is valid, maintain the state of the first port as the powering state, and the state of the second port as the powered state, and lock the first port as a power sourcing port, and if it is probed that the second port is connected to power sourcing equipment, maintain the state of the first port as the powering state, and the state of the second port as the powered state, and lock the second port as the power extraction port.

With reference to the second possible implementation of the second aspect, in a third possible implementation of the second aspect, the adaptive module is further configured to if it is detected that the first port is not connected to a valid powered device, and it is probed that the second port is not connected to power sourcing equipment, switch the state of the first port to the powered state, and switch the state of the second port to the powering state.

Alternatively, when the network device sets the switching period, the adaptive module is further configured to, if within the switching period, it is probed that the first port is not connected to power sourcing equipment, and the second port is not connected to power sourcing equipment, after the switching period expires, switch the state of the first port to the powered state, and switch the state of the second port to the powering state.

With reference to any one of the second aspect and the first to the third possible implementations of the second aspect, in a fourth possible implementation of the second aspect, when there is the power source supplying power to the network device, the state of the first port is the powered state, and the state of the second port is the powering state, the power sourcing chip is configured to detect whether the second port is connected to a valid powered device, and feed back a detection result of the second port to the adaptive module, and the adaptive module is further configured to probe whether the first port is connected to the power sourcing equipment, and receive the detection result of the second port that is fed back by the power sourcing chip, if it is probed that the first port is connected to the power sourcing equipment, maintain the state of the first port as the powered state, and the state of the second port as the powering state, and lock the first port as the power extraction port, and if it is detected that the second port is connected to the valid powered device, maintain the state of the first port as the powered state, and the state of the second port as the powering state, and lock the second port as the power sourcing port.

With reference to the fourth possible implementation of the second aspect, in a fifth possible implementation of the second aspect, the adaptive module is further configured to, if it is probed that the first port is not connected to the power sourcing equipment, and it is detected that the second port is not connected to a valid powered device, switch the state of the first port to the powering state, and switch the state of the second port to the powered state.

Alternatively, when the network device sets the switching period, the adaptive module is further configured to, if within the switching period, it is probed that the first port is not connected to power sourcing equipment, and it is detected that the second port is not connected to a valid powered device, after the switching period expires, switch the state of the first port to the powering state, and switch the state of the second port to the powered state.

With reference to the second aspect and the first to the fifth possible implementations of the second aspect, in a sixth possible implementation of the second aspect, the adaptive module is further configured to, if it is probed that the first port is not connected to power sourcing equipment, and the second port is not connected to power sourcing equipment, and there is no power source supplying power to the network device, continue to probe whether the first port and the second port are connected to the power sourcing equipment.

With reference to the second aspect and the first to the sixth possible implementations of the second aspect, in a seventh possible implementation of the second aspect, the adaptive module includes a first voltage detector, a second voltage detector, a switching switch, and a controller, where the first voltage detector is connected to the first port, the second voltage detector is connected to the second port, the power sourcing chip is connected to the switching switch, and the powered chip is connected to the switching switch, the switching switch is connected to the first port, and the switching switch is connected to the second port, the first voltage detector is configured to probe whether there is a valid input voltage on the first port, to probe whether the first port is connected to the power sourcing equipment, and feed back a probing result of the first port to the controller, the second voltage detector is configured to probe whether there is a valid input voltage on the second port, to probe whether the second port is connected to the power sourcing equipment, and feed back a probing result of the second port to the controller, the controller is configured to when the probing result of the first port is that the first port is connected to the power sourcing equipment, or the probing result of the second port is that the second port is connected to the power sourcing equipment, if a state of one of the first port and the second port that is connected to the power sourcing equipment is not the powered state, instruct the switching switch to switch the state of the first port and that of the second port, and lock one of the first port and the second port that is connected to the power sourcing equipment as the power extraction port, and the switching switch is configured to connect the first port and the power sourcing chip, and connect the second port and the powered chip, or connect the first port and the powered chip, and connect the second port and the power sourcing chip.

With reference to the seventh possible implementation of the second aspect, in an eighth possible implementation of the second aspect, the controller is further configured to, if the probing result of the first port is that the first port is not connected to the power sourcing equipment, the probing result of the second port is that the second port is not connected to the power sourcing equipment, and there is the power source supplying power to the network device, send a first instruction to the switching switch, where the first instruction is used to instruct the switching switch to switch the state of the first port to the powering state, and to switch the state of the second port to the powered state, or send a second instruction to the switching switch, where the second instruction is used to instruct the switching switch to switch the state of the first port to the powered state, and to switch the state of the second port to the powering state.

With reference to the seventh or the eighth possible implementation of the second aspect, in a ninth possible implementation of the second aspect, when there is the power source supplying power to the network device, the state of the first port is the powering state, and the state of the second port is the powered state, the power sourcing chip is configured to detect whether the first port is connected to a valid powered device, and feed back the detection result of the first port to the controller, and the controller is further configured to, if the detection result of the first port is valid, maintain the state of the first port as the powering state, and the state of the second port as the powered state, and lock the first port as the power sourcing port, and if the probing result of the second port is that the second port is connected to power sourcing equipment, maintain the state of the first port as the powering state, and the state of the second port as the powered state, and lock the second port as the power extraction port, or if the detection result of the first port is invalid, and the probing result of the second port is that the second port is not connected to power sourcing equipment, send the second instruction to the switching switch to instruct the switching switch to switch the state of the first port to the powered state, and to switch the state of the second port to the powering state.

With reference to any one of the seventh to the ninth possible implementations of the second aspect, in a tenth possible implementation of the second aspect, when there is the power source supplying power to the network device, the state of the first port is the powered state, and the state of the second port is the powering state, the power sourcing chip is specifically configured to detect whether the second port is connected to a valid powered device, and feed back the detection result of the second port to the controller, and the controller is further configured to, if the probing result of the first port is that the first port is connected to power sourcing equipment, maintain the state of the first port as the powered state, and the state of the second port as the powering state, and lock the first port as the power extraction port, and if the detection result of the second port is valid, maintain the state of the first port as the powered state, and the state of the second port as the powering state, and lock the second port as the power sourcing port, or if the probing result of the first port is that the first port is not connected to power sourcing equipment, and the detection result of the second port is invalid, send the first instruction to the switching switch to instruct the switching switch to switch the state of the first port to the powering state, and to switch the state of the second port to the powered state.

With reference to any one of the second aspect or the foregoing possible implementations, after the first port and/or the second port are/is locked, the first port and the second port are unlocked if an exception occurs in the network device, for example, an entire system or some components of the network device are faulty or a status indicating whether there is a power source supplying power to the network device changes (from a state in which there is a power source supplying power to a state in which there is no power source supplying power). Alternatively, the first port and/or the second port are/is unlocked if a device connected to the port changes (for example, is faulty or is disconnected). After both the first port and the second port are unlocked, the adaptive module may re-probe the first port and/or the second port.

In this way, in a network scenario in which a device interconnected with the network device frequently changes, there is no need to manually distinguish between the ports, and one of the first port and the second port may adaptively serve as the power extraction port and the other port serves as the power sourcing port, thereby improving network maintenance efficiency.

According to a third aspect, a network device is provided, including a first port, a second port, and the port adaptation apparatus according to any one of the second aspect or the possible implementations of the second aspect, where the port adaptation apparatus corresponds to the first port and the second port.

Optionally, the network device further includes a third port, where the third port is connected to a power sourcing chip and is a power sourcing port.

Optionally, the network device further includes a fourth port, where the fourth port is connected to a powered chip and is a power extraction port.

Optionally, the network device further includes a processor and a memory.

According to a fourth aspect, a power supply system is provided, including power sourcing equipment, an intermediate device, and a powered device, where a first port on the intermediate device is connected to the power sourcing equipment, and a second port on the intermediate device is connected to the powered device, and the intermediate device includes the port adaptation apparatus according to any one of the second aspect and the possible implementations of the second aspect, and the port adaptation apparatus corresponds to the first port and the second port.

Optionally, the power sourcing equipment includes the port adaptation apparatus according to any one of the second aspect or the possible implementations of the second aspect.

Optionally, the powered device includes the port adaptation apparatus according to any one of the second aspect or the possible implementations of the second aspect.

According to a fifth aspect, a computer storage medium is provided, and is used to store a computer program, where the computer program includes an instruction used to perform the port adaptation method in the first aspect.

DETAILED DESCRIPTION OF ILLUSTRATIVE EMBODIMENTS

The technical solutions provided in this application are described below with reference to the accompanying drawings and specific implementations.

Figure 1:
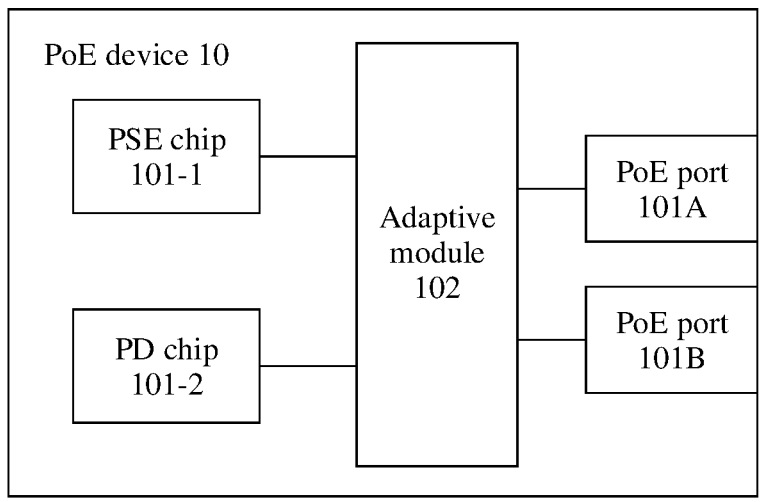
FIG. 1 is a schematic structural diagram of a PoE device according to an embodiment of the present invention.

Referring to FIG. 1, FIG. 1 is a schematic structural diagram of a PoE device according to an embodiment of the present invention. The PoE device 10 includes a PoE port 101A, a PoE port 101B, an adaptive module 102, a PSE chip 101-1, and a PD chip 101-2. The PSE chip 101-1 and the PD chip 101-2 are separately connected to the PoE port 101A and the PoE port 101B by using the adaptive module 102.

If one of the PoE port 101A and the PoE port 101B is a power sourcing port, the other port is a power extraction port. For example, if the PoE port 101A is a power sourcing port, the PoE port 101B is a power extraction port. Conversely, if the PoE port 101A is a power extraction port, the PoE port 101B is a power sourcing port.

The PoE port 101A and the PoE port 101B may be considered as a port group, for example, a PoE port group lob. If one of two ports in a port group is a power sourcing port, the other port can only be a power extraction port. Therefore, only one of two ports in a port group can be a power sourcing port, and the other port is a power extraction port. Two ports in a port group cannot be power sourcing ports at the same time, and cannot be power extraction ports at the same time.

The PSE chip 101-1 is connected to a power management system (not shown in the figure) of the PoE device, and may extract power from the power management system. The PD chip 101-2 is connected to the power management system of the PoE device, and may supply power to the power management system.

The adaptive module 102 is configured to probe whether the PoE port 101A and the PoE port 101B are connected to power sourcing equipment, and is further configured to control the PoE port 101A to connect to the PSE chip 101-1 and control the PoE port 101B to connect to the PD chip 101-2, or control the PoE port 101B to connect to the PSE chip 101-1 and control the PoE port 101A to connect to the PD chip 101-2, so that one port is a power extraction port, and the other port is a power sourcing port.

Optionally, at an initial moment, if both the PoE port 101A and the PoE port 101B are in a disconnected state, regardless of whether there is a power source supplying power to the PoE device 10, the adaptive module 102 probes whether the PoE port 101A and the PoE port 101B are connected to the power sourcing equipment.

Optionally, at an initial moment, if one of the PoE port 101A and the PoE port 101B is in a PSE state, the other port is in a PD state, and there is no power source supplying power to the PoE device 10, the adaptive module 102 probes whether the PoE port 101A and the PoE port 101B are connected to the power sourcing equipment.

Optionally, at an initial moment, if one of the PoE port 101A and the PoE port 101B is in a PSE state, the other port is in a PD state, and there is a power source supplying power to the PoE device 10, the adaptive module 102 probes the port that is in the PD state, and the PSE chip 101-1 detects the port that is in the PSE state. For example, at the initial moment, if the PoE port 101A is in the PSE state, and the PoE port 101B is in the PD state, the adaptive module 102 probes the PoE port 101B, and the PSE chip 101-1 detects the PoE port 101A.

A status of a port includes a disconnected state, a PSE state, and a PD state. The disconnected state indicates that the port is connected to neither a PSE chip nor a PD chip. A first state, also referred to as a powering (powering) state or the PSE state, indicates that the port is connected to the PSE chip (a power sourcing chip). A second state, also referred to as a powered (powered) state or the PD state, indicates that the port is connected to the PD chip (a powered chip).

In this embodiment of the present invention, a power source supplies power may be Ethernet supplies power, or a local power source (for example, an adapter power source) supplies power.

The adaptive module 102 is configured to probe whether the PoE port 101A and the PoE port 101B are connected to the power sourcing equipment, and if it is probed that the PoE port 101A or the PoE port 101B is connected to the power sourcing equipment, maintain or switch the state of the PoE port 101A and that of the PoE port 101B. Specifically, if both the PoE port 101A and the PoE port 101B are originally in the disconnected state, and it is probed that one port is connected to the power sourcing equipment, the port connected to the power sourcing equipment is switched to the PD state, and a state of the other port is switched to the PSE state. If it is probed that the port that is originally in the PD state is connected to the power sourcing equipment, the states of the two ports remain unchanged. In a specific implementation, the adaptive module 102 may not perform any operation when the states of the two ports remain unchanged. If it is probed that the port that is originally in the PSE state is connected to the power sourcing equipment, the states of the two ports are switched. Then, the adaptive module 102 locks one of the PoE port 101A and the PoE port 101B that is connected to the power sourcing equipment as the power extraction port, for example, sets a lock tag (no longer switches the state of the PoE port 101A and that of the PoE port 101B), and may directly lock the other port as the power sourcing port, or may maintain a powering state and then lock the other port as the power sourcing port after it is detected that the other port is connected to a valid (valid) PD.

In a specific implementation, if either port in the port group (the PoE port 101A and the PoE port 101B) is locked, the port group is locked, and the states of the ports cannot be switched anymore. The states of the ports can be switched only when neither of the two ports in the port group (the PoE port 101A and the PoE port 101B) is locked.

In a specific implementation, to avoid frequent switching, the adaptive module 102 may set a switching period, that is, set a limited time for state switching of the PoE port 101A and that of the PoE port 101B. Within the limited time, even if a switching condition is met, switching is not immediately performed, but is performed after the limited time expires. Within a switching period, the state of the PoE port 101A and that of the PoE port 101B may be maintained. After the switching period expires, if the switching condition is met, each of the PoE port 101A and the PoE port 101B may be switched from one state to another state. For example, a situation in which both the PoE port 101A and the PoE port 101B are in the disconnected state is switched to a situation in which the PoE port 101A is in the PSE state and the PoE port 101B is in the PD state (or the PoE port 101A is in the PD state and the PoE port 101B is in the PSE state). For another example, a situation in which the PoE port 101A is in the PSE state and the PoE port 101B is in the PD state is switched to a situation in which the PoE port 101A is in the PD state and the PoE port 101B is in the PSE state.

It may be understood that the switching period works only when there is a power source supplying power to the PoE device 10.

If there is no power source supplying power to the PoE device 10, and neither the PoE port 101A nor the PoE port 101B is connected to the power sourcing equipment, the adaptive module 102 cannot switch the states of the ports, but can only continuously probe the PoE port 101A and the PoE port 101B, and may perform switching only after it is probed that one of the PoE port 101A and the PoE port 101B is connected to the power sourcing equipment, for example, switch one of the PoE port 101A and the PoE port 101B from the disconnected state to the PD state and switch the other port from the disconnected state to the PSE state (it may be understood that, in this case, the adaptive module 102 may not perform switching, for example, if it is probed that the PoE port 101A is connected to the power sourcing equipment, the state of the PoE port 101A is the PD state, and the state of the PoE port 101B is the PSE state, maintain the state of the PoE port 101A as the PD state, and the state of the PoE port 101B as the PSE state), and then determine (lock) the port connected to the power sourcing equipment as the power extraction port. Correspondingly, the other port can only serve as the power sourcing port. In this case, the other port may be directly locked as the power sourcing port, or may be locked as the power sourcing port after it is detected that the other port is connected to a valid PD.

The adaptive module 102 probes the PoE port 101A and the PoE port 101B when both the PoE port 101A and the PoE port 101B are in the disconnected state (regardless of whether there is a power source supplying power) or when there is no power source supplying power to the PoE device 10.

The adaptive module 102 may probe the PoE port 101A and the PoE port 101B a plurality of times within a switching period.

If the adaptive module 102 probes that the PoE port 101A is connected to the power sourcing equipment, the adaptive module 102 maintains or switches the state of the PoE port 101A and that of the PoE port 101B, and locks the PoE port 101A as the power extraction port. Specifically, if originally, the state of the PoE port 101A is the PD state, and the state of the PoE port 101B is the PSE state, the adaptive module 102 maintains the state of the PoE port 101A and that of the PoE port 101B. If originally, the state of the PoE port 101A is not the PD state (for example, is the disconnected state or the PSE state), the adaptive module 102 controls the PoE port 101A to connect to the PD chip 101-2, and controls the PoE port 101B to connect to the PSE chip 101-1 (that is, switches the state of the PoE port 101A to the PD state, and switches the state of the PoE port 101B to the PSE state). The adaptive module 102 may set a lock tag to lock the PoE port 101A as the power extraction port. Correspondingly, the PoE port 101B can only serve as the power sourcing port. The PoE port 101B may be directly locked as the power sourcing port when the PoE port 101A is locked as the power extraction port. Alternatively, the PoE port 101B may be locked as the power sourcing port after it is detected that the PoE port 101B is connected to the valid PD.

If the adaptive module 102 probes that the PoE port 101B is connected to the power sourcing equipment, the adaptive module 102 maintains or switches the state of the PoE port 101A and that of the PoE port 101B, and locks the PoE port 101B as the power extraction port. Specifically, if originally, the state of the PoE port 101B is the PD state, and the state of the PoE port 101A is the PSE state, the adaptive module 102 maintains the state of the PoE port 101A and that of the PoE port 101B. If originally, the state of the PoE port 101B is not the PD state (for example, is the disconnected state or the PSE state), the adaptive module 102 switches the PoE port 101B to connect to the PD chip 101-2, and switches the PoE port 101A to connect to the PSE chip 101-1 (that is, switches the state of the PoE port 101B to the PD state, and switches the state of the PoE port 101A to the PSE state). The adaptive module 102 may set a lock tag to lock the PoE port 101B as the power extraction port. Correspondingly, the PoE port 101A can only serve as the power sourcing port. The PoE port 101A may be directly locked as the power sourcing port when the PoE port 101B is locked as the power extraction port. Alternatively, the PoE port 101A may be locked as the power sourcing port after it is detected that the PoE port 101A is connected to the valid PD.

If it is simultaneously probed that the PoE port 101A and the PoE port 101B are connected to the power sourcing equipment, it may be considered, according to a preset rule (for example, in a random manner or in an order of port numbers), that it is probed that the PoE port 101A is connected to the power sourcing equipment, or it is probed that the PoE port 101B is connected to the power sourcing equipment. A subsequent processing process is the same as that described above.

If the adaptive module 102 neither probes that the PoE port 101A is connected to the power sourcing equipment nor probes that the PoE port 101B is connected to the power sourcing equipment (both a probing result of the PoE port 101A and that of the PoE port 101B are invalid), and there is no power source supplying power to the PoE device 10, the adaptive module 102 continues to probe whether the PoE port 101A and the PoE port 101B are connected to the power sourcing equipment.

If the adaptive module 102 neither probes that the PoE port 101A is connected to the power sourcing equipment nor probes that the PoE port 101B is connected to the power sourcing equipment, and there is the power source supplying power to the PoE device 10 (in this case, both the PoE port 101A and the PoE port 101B are in the disconnected state at an initial moment), the adaptive module 102 may switch the state of the PoE port 101A and that of the PoE port 101B. If a switching period is set, the adaptive module 102 may switch the state of the PoE port 101A and that of the PoE port 101B after the switching period expires.

Specifically, the adaptive module 102 selects either of the PoE port 101A and the PoE port 101B to connect to the PSE chip 101-1. In this case, the other port is connected to the PD chip 101-2. That is, one of the PoE port 101A and the PoE port 101B is switched from the disconnected state to the PSE state, and the other port is switched from the disconnected state to the PD state. For example, the adaptive module 102 selects the PoE port 101A to connect to the PSE chip 101-1, the PoE port 101B to connect to the PD chip 101-2, that is, switches the state of the PoE port 101A to the PSE state, and switches the state of the PoE port 101B to the PD state. Then, the PSE chip 101-1 detects the PoE port 101A, that is, detects whether the PoE port 101A is connected to the valid PD. The adaptive module 102 probes whether the PoE port 101B is connected to the power sourcing equipment.

The PSE chip 101-1 may send a detection voltage to the PoE port 101A to measure impedance of the PoE port 101A, and determine, according to the measured impedance, whether the PoE port 101A is connected to the valid PD, to obtain a detection result. The detection result may be valid or invalid. If the detection result is valid, it indicates that the PoE port 101A is connected to the valid PD. If the detection result is invalid, it indicates that the PoE port 101A is not connected to the valid PD or any device. The PSE chip 101-1 may feed back the detection result to the adaptive module 102.

The adaptive module 102 locks a port whose result is valid if the PSE chip 101-1 detects that the PoE port 101A is connected to the valid PD (the detection result of the PoE port 101A is valid), or if the adaptive module 102 probes that the PoE port 101B is connected to the power sourcing equipment (a probing result of the PoE port 101B is valid), that is, three possible cases exist In a first possible case, only the detection result is valid (it is detected that the PoE port 101A is connected to the valid PD), in a second possible case, only the probing result is valid (it is probed that the PoE port 101B is connected to the power sourcing equipment), and in a third possible case, the detection result is valid and the probing result is valid. Specifically, the adaptive module 102 locks the PoE port 101A as the power sourcing port and/or locks the PoE port 101B as the power extraction port (that is, locks the PoE port 101A as the power sourcing port or locks the PoE port 101B as the power extraction port, or locks the PoE port 101A as the power sourcing port and locks the PoE port 101B as the power extraction port). Optionally, if a switching period is set, the adaptive module 102 stops timing of the switching period.

The adaptive module 102 switches the state of the PoE port 101A and that of the PoE port 101B if the PSE chip 101-1 does not detect that the PoE port 101A is connected to the valid PD (the detection result of the PoE port 101A is invalid), and if the adaptive module 102 does not probe that the PoE port 101B is connected to the power sourcing equipment (a probing result of the PoE port 101B is invalid). If a switching period is set, when within the switching period, each detection result of the PoE port 101A is invalid, and each probing result of the PoE port 101B is invalid, the adaptive module 102 may switch the state of the PoE port 101A and that of the PoE port 101B after the switching period expires. Specifically, the adaptive module 102 switches the PoE port 101A to connect to the PD chip 101-2, and switches the PoE port 101B to connect to the PSE chip 101-1 (that is, switches the state of the PoE port 101A to the PD state, and switches the state of the PoE port 101B to the PSE state).

Then, the PSE chip 101-1 detects whether the PoE port 101B is connected to a valid PD, and the adaptive module 102 probes whether the PoE port 101A is connected to the power sourcing equipment. According to a probing result and a detection result, the adaptive module 102 locks the port or switches the state of the port. A specific process is the same as that described above, and details are not described herein again.

In this embodiment of the present invention, the switching period may be determined based on duration of one time of probing and duration of one time of detection. For example, the switching period is set to an integer multiple of a longer one between detection duration and probing duration. This is not limited in the present invention.

Within the switching period, after probing that a port is connected to the power sourcing equipment, the adaptive module 102 may stop probing the port, instead of waiting to stop probing the port when or after the port is locked. Likewise, after detecting that a port is connected to a valid PD, the PSE chip 101-1 may stop detecting the port.

When there is the power source supplying power to the PoE device 10, if at the initial moment, one of the PoE port 101A and the PoE port 101B is in the PSE state, and the other port is in the PD state, the adaptive module 102 probes the port that is in the PD state, and the PSE chip 101-1 detects the port that is in the PSE state. A specific processing process is the same as that described above, and details are not described herein again.

After the port group (the PoE port 101A and the PoE port 101B) is locked, the port group may be unlocked (the PoE port 101A is unlocked and the PoE port 101B is unlocked) if an exception occurs in the PoE device 10, for example, the PSE chip 101-1 or the PD chip 101-2 is faulty, an entire system of the PoE device 10 is faulty, or a status indicating whether there is a power source supplying power to the PoE device 10 changes (from a state in which there is a power source supplying power to a state in which there is no power source supplying power). In addition, after the port group is locked, a port may be unlocked if a device connected to the port changes (for example, is faulty or is disconnected). The port group is unlocked only after both the PoE port 101A and the PoE port 101B are unlocked. After the port group is unlocked, a port adaptation process described in this embodiment of the present invention may be re-performed.

In this embodiment of the present invention, after one of the PoE port 101A and the PoE port 101B is locked as the power extraction port, the other port can only serve as the power sourcing port. Likewise, after one port is locked as the power sourcing port, the other port can only serve as the power extraction port. The port group is locked after either port in the port group (the PoE port 101A and the PoE port 101B) is locked. The port group is unlocked only after both of the two ports in the port group are unlocked.

The PoE device 10 in this embodiment of the present invention may be an Ethernet device that supports PoE, such as a switch, a router, or an AP. The PSE chip is a chip designed to meet a PSE function required in the PoE Protocol, and can usually provide functions such as detection (detection) and classification (classification).

In addition to the PoE port 101A and the PoE port 101B, the PoE device 10 may include another PoE port. The another PoE port may be a power sourcing port directly connected to a PSE chip, or may be a power extraction port directly connected to a PD chip. Certainly, the PoE device 10 may further include another port group described above. This is not limited in the present invention.

Figure 2:
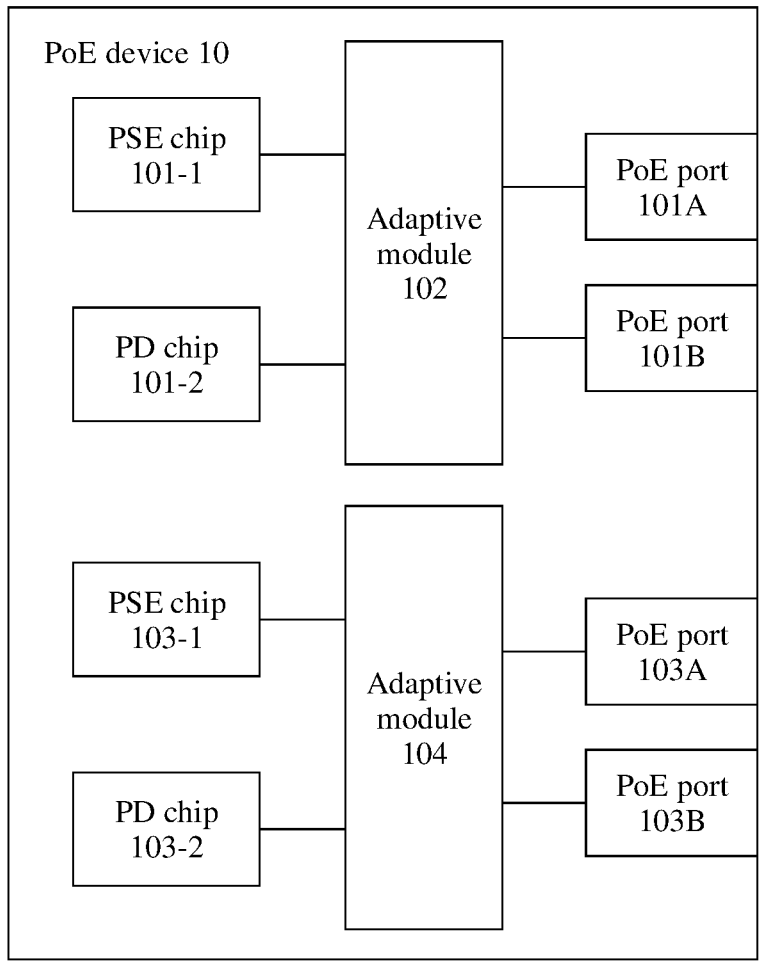
FIG. 2 is a schematic structural diagram of another PoE device according to an embodiment of the present invention.

For example, as shown in FIG. 2, the PoE device 10 further includes a PoE port 103A, a PoE port 103B, an adaptive module 104, a PSE chip 103-1, and a PD chip 103-2. The PSE chip 103-1 and the PD chip 103-2 correspond to the PoE port 103A and the PoE port 103B, and are separately connected to the PoE port 103A and the PoE port 103B by using the adaptive module 104. The adaptive modules 102 and 104 may be independently disposed, or may be integrated together. This is not limited in the present invention.

Further, the PoE device 10 includes a processor (not shown in the figure), such as a central processing unit (central processing unit, CPU), a network processor (network processor, NP for short), or a combination of a CPU and an NP. The processor is configured to perform communication between the PoE device 10 and another device. For example, the PoE device 10 performs data link layer supply power negotiation, data transmission, and the like with interconnected power sourcing equipment or an interconnected powered device.

Optionally, the PoE device 10 further includes a memory (not shown in the figure), configured to store data and/or a program. The memory may include a volatile memory (volatile memory), such as a random-access memory (random-access memory, RAM for short). Alternatively, the memory may include a non-volatile memory (non-volatile memory), such as a flash memory (flash memory), a hard disk (hard disk drive, HDD for short), or a solid state drive (solid-state drive, SSD for short). Alternatively, the memory may include a combination of the foregoing types of memories.

In this embodiment of the present invention, for the PoE device that can serve as both the power sourcing equipment and the powered device, a PSE chip and a PD chip are disposed for the two PoE ports (one port group) on the PoE device. According to devices connected at peer ends, one of the two PoE ports may adaptively become the power sourcing port, and the other port becomes the power extraction port. In this way, when a network is deployed for device interconnection, a connection can succeed without a need to distinguish whether a port is a power sourcing port or a power extraction port, so that a prior-art problem of a connection error is resolved.

The PoE device provided in this embodiment of the present invention is merely an example that describes connection relationships and functions of components, modules, and the like that are in the PoE device and related to the present invention. A person skilled in the art may understand that the PoE device may further include another device according to a function and a service requirement. For example, if the PoE device is a wireless AP, the PoE device may further include a WLAN chip, an antenna, and the like. This is not limited in the present invention.

Figure 3:
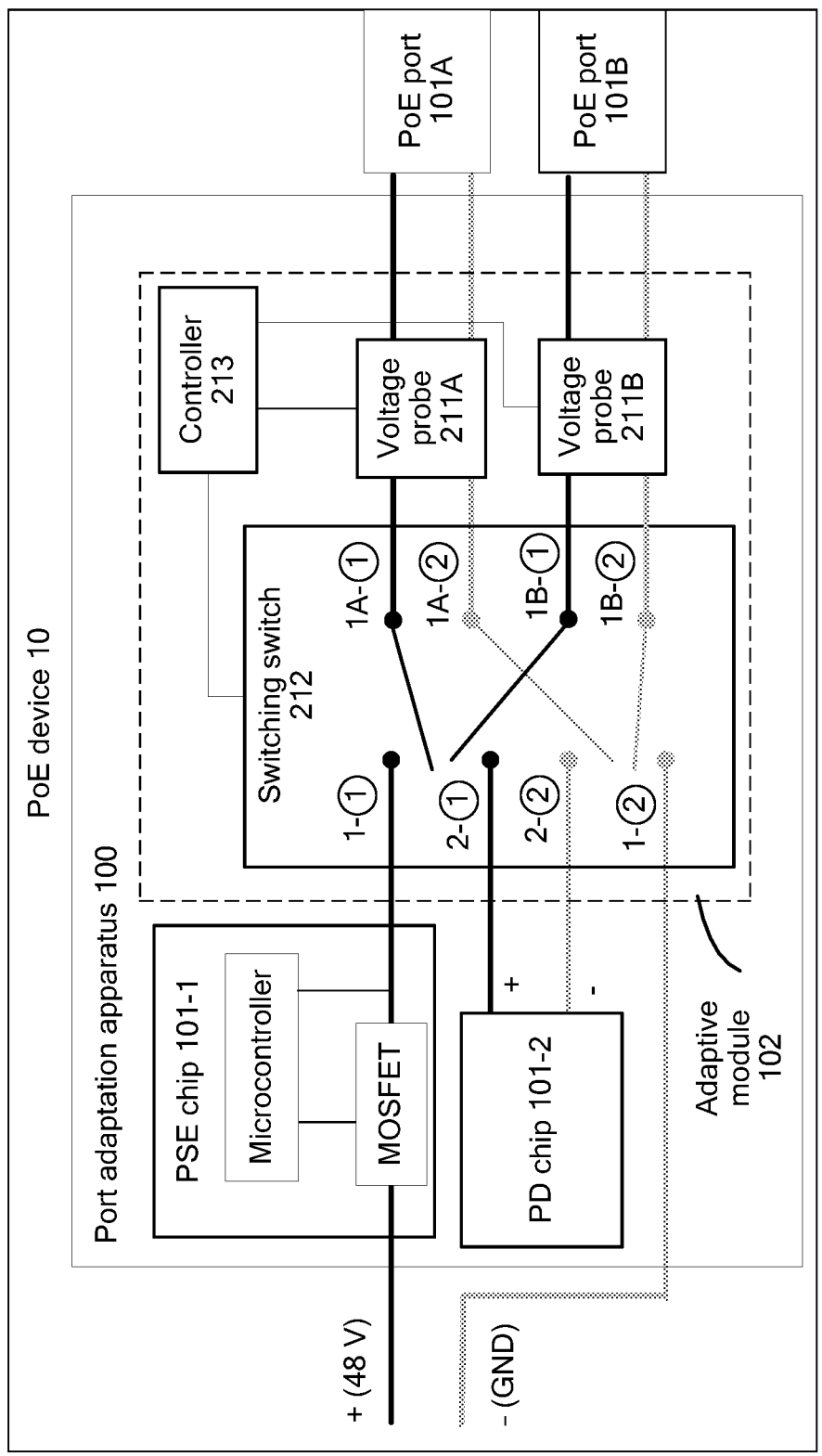
FIG. 3 is a schematic circuit diagram of a port adaptation apparatus in a PoE device according to an embodiment of the present invention.

Referring to FIG. 3, FIG. 3 is a schematic circuit diagram of a port adaptation apparatus in a PoE device 10 according to an embodiment of the present invention. As shown in FIG. 3, the port adaptation apparatus 100 includes a PSE chip 101-1, a PD chip 101-2, a voltage detector 211A, a voltage detector 211B, a switching switch 212, and a controller 213.

The port adaptation apparatus 100 corresponds to a PoE port 101A and a PoE port 101B on the PoE device 10. The PoE port 101A and the PoE port 101B may be considered as a port group. The port adaptation apparatus 100 is configured to enable one of the PoE port 101A and the PoE port 101B to adaptively become a power sourcing port, and the other port to become a power extraction port.

The PSE chip 101-1 is connected to a power system, and may supply power to a powered device at a peer end (for example, provide a voltage of 48 V). The PD chip 101-2 may extract power from power sourcing equipment at a peer end, to supply power to the power system of the PoE device 10.

Optionally, the voltage detector 211A, the voltage detector 211B, the switching switch 212, and the controller 213 are considered as an implementation of the adaptive module 102 shown in FIG. 1.

The switching switch 212 may be understood as two double-pole double-throw (double pole, double throw) switches, and may be implemented by a metal-oxide-semiconductor field-effect transistor (Metal-Oxide-Semiconductor Field-Effect Transistor, MOSFET), a relay, an optoisolator, a triode, and the like. A double-pole double-throw switch may also be understood as two single-pole double-throw (single pole, double throw) switches controlled according to a uniform rule, that is, two linked single-pole double-throw switches. FIG. 3 is merely a schematic diagram of the switching switch 212.

When 1A-① is connected to 1-①, 1A-② is connected to 1-① through linkage, so that the PoE port 101A is connected to the PSE chip 101-1. Correspondingly, when 1B-① is connected to 2-①, 1B-② is connected to 2-② through linkage, so that the PoE port 101B is connected to the PD chip 101-2.

When 1B-① is connected to 1-①, 1B-② is connected to 1-② through linkage, so that the PoE port 101B is connected to the PSE chip 101-1. Correspondingly, when 1A-① is connected to 2-①, 1A-② is connected to 2-② through linkage, so that the PoE port 101B is connected to the PD chip 101-2.

The switching switch 212 shown in FIG. 3 is in a disconnected state. In this case, the PoE port 101A is connected to neither the PSE chip 101-1 nor the PD chip 101-2, and the PoE port 101B is connected to neither the PSE chip 101-1 nor the PD chip 101-2. That is, both the PoE port 101A and the PoE port 101B are in a disconnected state.

The controller 213 is configured to control the switching switch 212. Specifically, the controller 213 is configured to send a first instruction or a second instruction to the switching switch 212 to instruct the switching switch 212 to switch a state of the PoE port 101A and that of the PoE port 101B.

According to the first instruction of the controller 213, the switching switch 212 connects the PoE port 101A and the PSE chip 101-1 (that is, the switching switch 212 is instructed to connect 1A-①️ and 1-①, and 1A-② is connected to 1-② through linkage), and connects the PoE port 101B and the PD chip 101-2 (that is, the switching switch 212 is instructed to connect 1B-① and 2-①, and 1B-② is connected to 2-② through linkage), so that the PoE port 101A is in a powering state, and the PoE port 101B is in a powered state. Alternatively, according to the second instruction, the switching switch 212 connects the PoE port 101A and the PD chip 101-2 (that is, the switching switch 212 is instructed to connect 1A-① and 2-②, and 1A-② is connected to 2-② through linkage), and connects the PoE port 101B and the PSE chip 101-1 (that is, the switching switch 212 is instructed to connect 1B-① and 1-①, and 1B-② is connected to 1-② through linkage), so that the PoE port 101A is in a powered state, and the PoE port 101B is in a powering state.

The voltage detector 211A is configured to probe whether there is a valid input voltage on the PoE port 101A, to probe whether the PoE port 101A is connected to the power sourcing equipment, and feed back a probing result of the PoE port 101A to the controller. The voltage detector 211B is configured to probe whether there is a valid input voltage on the PoE port 101B, to probe whether the PoE port 101B is connected to the power sourcing equipment, and feed back a probing result of the PoE port 101B to the controller.

The valid input voltage is a voltage specified to meet the PoE standard, for example, 2.8 volts to 57 volts (V), and includes a detection voltage in a detection phase, a classification voltage in a classification phase, a voltage in a power-on phase, or a supply voltage in a power supply phase. The probing result may be valid or invalid. If the probing result is valid, that is, there is a valid input voltage on a port, it indicates that the port is connected to the power sourcing equipment. If the probing result is invalid, that is, there is no valid input voltage on a port, it indicates that the port is not connected to the power sourcing equipment.

After probing that there is the valid input voltage on the PoE port 101A, the voltage detector 211A feeds back the probing result (valid) of the PoE port 101A to the controller 213, and the voltage detector 211A may stop performing probing.

After probing that there is the valid input voltage on the PoE port 101B, the voltage detector 211B feeds back the probing result (valid) of the PoE port 101B to the controller 213, and the voltage detector 211B may stop performing probing.

When there is a power source supplying power to the PoE device 10, a voltage detector may feed back a probing result to the controller 213 each time after probing is performed, or may feed back a probing result to the controller 213 only when the probing result is valid. The controller 213 may record a probing result of a port, for example, record the probing result in a register corresponding to the port.

The PSE chip 101-1 is configured to detect whether a port connected to the PSE chip 101-1 is connected to a valid PD. A detection result may be valid or invalid. If the detection result is valid, it indicates that the port is connected to the valid PD. If the detection result is invalid, it indicates that the port is not connected to the valid PD or any device. It may be understood that the PSE chip 101-1 can work only when there is a power source supplying power to the PoE device 10. If there is no power source supplying power to the PoE device 10, the PSE chip 101-1 does not work.

The controller 213 is specifically configured to when the probing result of the PoE port 101A is that the PoE port 101A is connected to the power sourcing equipment, or the probing result of the PoE port 101B is that the PoE port 101B is connected to the power sourcing equipment, if a state of a port of the PoE port 101A and the PoE port 101B that is connected to the power sourcing equipment is not a powered state, instruct the switching switch 212 to switch the state of the PoE port 101A and that of the PoE port 101B, and then lock the port of the PoE port 101A and the PoE port 101B that is connected to the power sourcing equipment as the power extraction port. Correspondingly, the other port can only serve as the power sourcing port. In this case, the other port may be directly locked as the power sourcing port, or may be locked as the power sourcing port after it is detected that the other port is connected to a valid PD. For example, it is probed that the PoE port 101A is connected to the power sourcing equipment (that is, the probing result of the PoE port 101A is valid). If the state of the PoE port 101A is not the powered state (but is a disconnected state or a PSE state), the controller 213 sends the second instruction to the switching switch 212 to instruct the switching switch 212 to switch the state of the PoE port 101A and that of the PoE port 101B (that is, instruct the switching switch 212 to connect the PoE port 101A and the PD chip 101-2 and to connect the PoE port 101B and the PSE chip 101-1), and then locks the PoE port 101A as the power extraction port, so that the PoE port 101A is connected to the PD chip 101-2, and the PoE port 101B is connected to the PSE chip 101-1. If the state of the PoE port 101A is the powered state (correspondingly, the state of the PoE port 101B is a PSE state), the controller 213 no longer needs to instruct the switching switch 212 to switch the state of the PoE port 101A and that of the PoE port 101B, and may directly lock the PoE port 101A as the power extraction port. The PoE port 101B may be directly locked as the power sourcing port when the PoE port 101A is locked as the power extraction port. Alternatively, the PoE port 101B may be locked as the power sourcing port after it is detected that the PoE port 101B is connected to a valid PD.

The controller is further specifically configured to, if the probing result of the PoE port 101A is that the PoE port 101A is not connected to the power sourcing equipment, the probing result of the PoE port 101B is that the PoE port 101B is not connected to the power sourcing equipment, and there is the power source supplying power to the PoE device 10, send the first instruction to the switching switch 212 to instruct the switching switch 212 to switch the state of the PoE port 101A to the powering state, and to switch the state of the PoE port 101B to the powered state, or send the second instruction to the switching switch 212 to instruct the switching switch 212 to switch the state of the PoE port 101A to the powered state, and to switch the state of the PoE port 101B to the powering state.

When there is the power source supplying power to the PoE device 10, the state of the PoE port 101A is the powering state, and the state of the PoE port 101B is the powered state, the PSE chip 101-1 is specifically configured to detect whether the PoE port 101A is connected to a valid powered device, and feed back a detection result of the PoE port 101A to the controller 213. The controller 213 is further specifically configured to, if the detection result of the PoE port 101A is valid or the probing result of the PoE port 101B is that the PoE port 101B is connected to the power sourcing equipment (valid) (the detection result of the PoE port 101A is valid, the probing result of the PoE port 101B is valid, or both the detection result of the PoE port 101A and the probing result of the PoE port 101B are valid), lock the PoE port 101A as the power sourcing port, and/or lock the PoE port 101B as the power extraction port (that is, lock the PoE port 101A as the power sourcing port or lock the PoE port 101B as the power extraction port, or lock the PoE port 101A as the power sourcing port and lock the PoE port 101B as the power extraction port). The controller 213 is further specifically configured to, if the detection result of the PoE port 101A is invalid and the probing result of the PoE port 101B is that the PoE port 101B is not connected to the power sourcing equipment (invalid), send the second instruction to the switching switch 212 to instruct the switching switch 212 to switch the state of the PoE port 101A to the powered state, and to switch the state of the PoE port 101A to the powering state.

When there is the power source supplying power to the PoE device 10, the state of the PoE port 101A is the powered state, and the state of the PoE port 101B is the powering state, the PSE chip 101-1 is specifically configured to detect whether the PoE port 101B is connected to a valid powered device, and feed back a detection result of the PoE port 101B to the controller 213. The controller 213 is further specifically configured to, if the probing result of the PoE port 101A is that the PoE port 101A is connected to the power sourcing equipment (valid) or the detection result of the PoE port 101B is valid, lock the PoE port 101A as the power extraction port, and/or lock the PoE port 101B as the power sourcing port, or if the probing result of the PoE port 101A is invalid and the detection result of the PoE port 101B is invalid, send the first instruction to the switching switch 212 to instruct the switching switch 212 to switch the state of the PoE port 101A to the powering state, and to switch the state of the PoE port 101B to the powered state.

The controller 213 is further configured to unlock the port group. After the port group is unlocked, a port may be in a disconnected state, a PSE state, or a PD state.

After locking the port group, the controller 213 may unlock the port group if an exception occurs in the PoE device 10, for example, the PSE chip 101-1 or the PD chip 101-2 is faulty, an entire system of the PoE device 10 is faulty, or a status indicating whether there is a power source supplying power to the PoE device 10 changes (from a state in which there is a power source supplying power to a state in which there is no power source supplying power). In addition, after the port group is locked, a port may be unlocked if a device connected to the port changes (for example, is faulty or is disconnected). The port group is unlocked only after both of the two ports in the port group are unlocked. After the port group is unlocked, a port adaptation process described in this embodiment of the present invention may be re-performed.

A lock tag corresponding to the PoE port 101A may be set in a register of the PoE port 101A, and a lock tag corresponding to the PoE port 101B may be set in a register of the PoE port 101B. Alternatively, a lock tag corresponding to the PoE port 101A and a lock tag corresponding to the PoE port 101B may be separately set in a register of the controller 213. Alternatively, a lock status corresponding to the PoE port 101A and that corresponding to the PoE port 101B may be separately set and stored in a memory, and are respectively used as a lock tag corresponding to the PoE port 101A and that corresponding to the PoE port 101B. Alternatively, lock tags may be set in the switching switch 212, and are operated by the controller 213. The controller 213 may use two bits as the lock tag of the PoE port 101A and the lock tag of the PoE port 101B respectively, to lock or unlock the PoE port 101A and the PoE port 101B. For example, if a bit is set to 1, it indicates that a port is locked, or if a bit is set to 0, it indicates that a port is not locked. When the port group is locked, the state of the port cannot be switched, and therefore the switching switch 212 cannot perform switching. After the port group is unlocked, the switching switch 212 can perform switching to switch the state of the port. Specifically, there may be a plurality of different implementations. This is not limited in the present invention.

Optionally, the controller 213 sets a switching period for periodically switching the state of the PoE port 101A and that of the PoE port 101B when there is the power source supplying power to the PoE device 10. The controller 213 performs timing according to the switching period. Within a switching period, the state of the PoE port 101A and that of the PoE port 101B are maintained, so that a voltage detector may perform probing, and a PSE chip may perform detection. After the switching period expires, the controller 213 may control the switching switch 212 (send an instruction to the switching switch 212) to switch the PoE port 101A and the PoE port 101B from one state to another state.

In this embodiment of the present invention, the port adaptation apparatus is disposed for the two PoE ports (one port group) on the PoE device. The port adaptation apparatus ensures that, according to interconnected devices, one of the two PoE ports adaptively serves as the power sourcing port, and the other port serves as the power extraction port, so that there is no need to manually distinguish between the power sourcing port and the power extraction port, and a prior-art problem of a connection error is accordingly resolved.

An embodiment of the present invention further provides a power supply system, including power sourcing equipment, an intermediate device, and a powered device. The intermediate device is the PoE device 10 shown in FIG. 2. A first port on the intermediate device is connected to the power sourcing equipment, and a second port on the intermediate device is connected to the powered device. The intermediate device includes the port adaptation apparatus shown in FIG. 3, and the port adaptation apparatus is connected (corresponds) to the first port and the second port. The power sourcing equipment is configured to supply power to the intermediate device. The powered device is configured to extract power from the intermediate device.

The intermediate device may further include another port adaptation apparatus that is connected (corresponds) to a third port and a fourth port on the intermediate device.

Figure 4:
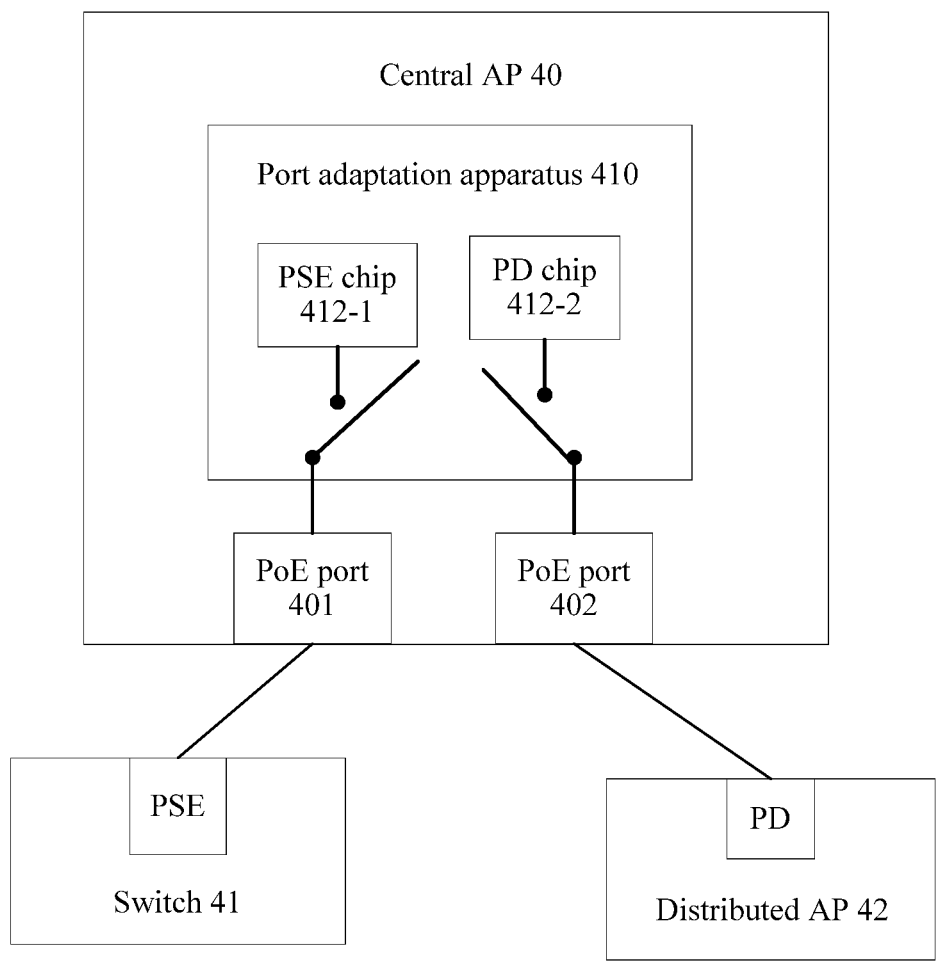
FIG. 4 is a schematic topological diagram of a distributed WLAN according to an embodiment of the present invention.

FIG. 4 shows a distributed WLAN according to an embodiment of the present invention. The distributed WLAN may be understood as a specific implementation of the foregoing power supply system. In the distributed WLAN, the PoE device 10 provided in this embodiment of the present invention is used as a central AP 40. The central AP 40 is connected to a switch 41 in an uplink, and is connected to a distributed AP 42 in a downlink. The switch 41 is power sourcing equipment, and may supply power to the central AP 40. The distributed AP 42 is a powered device, and may extract power from the central AP 40.

A PoE port 401 and a PoE port 402 on the PoE device 10 are connected to a first port adaptation apparatus 410. For a structure of the first port adaptation apparatus 410, refer to FIG. 3. FIG. 4 is merely used as an example. Specifically, corresponding to the PoE port 401 and the PoE port 402, a PSE chip and a PD chip are disposed in the first port adaptation apparatus 410. p According to a device interconnected with the PoE port 401 and that interconnected with the PoE port 402, the first port adaptation apparatus 410 enables one of the PoE port 401 and the PoE port 402 to adaptively serve as a power sourcing port, and enables the other port to serve as a power extraction port.

The PoE port 401 and the PoE port 402 may be considered as a port group.

Figure 5A:
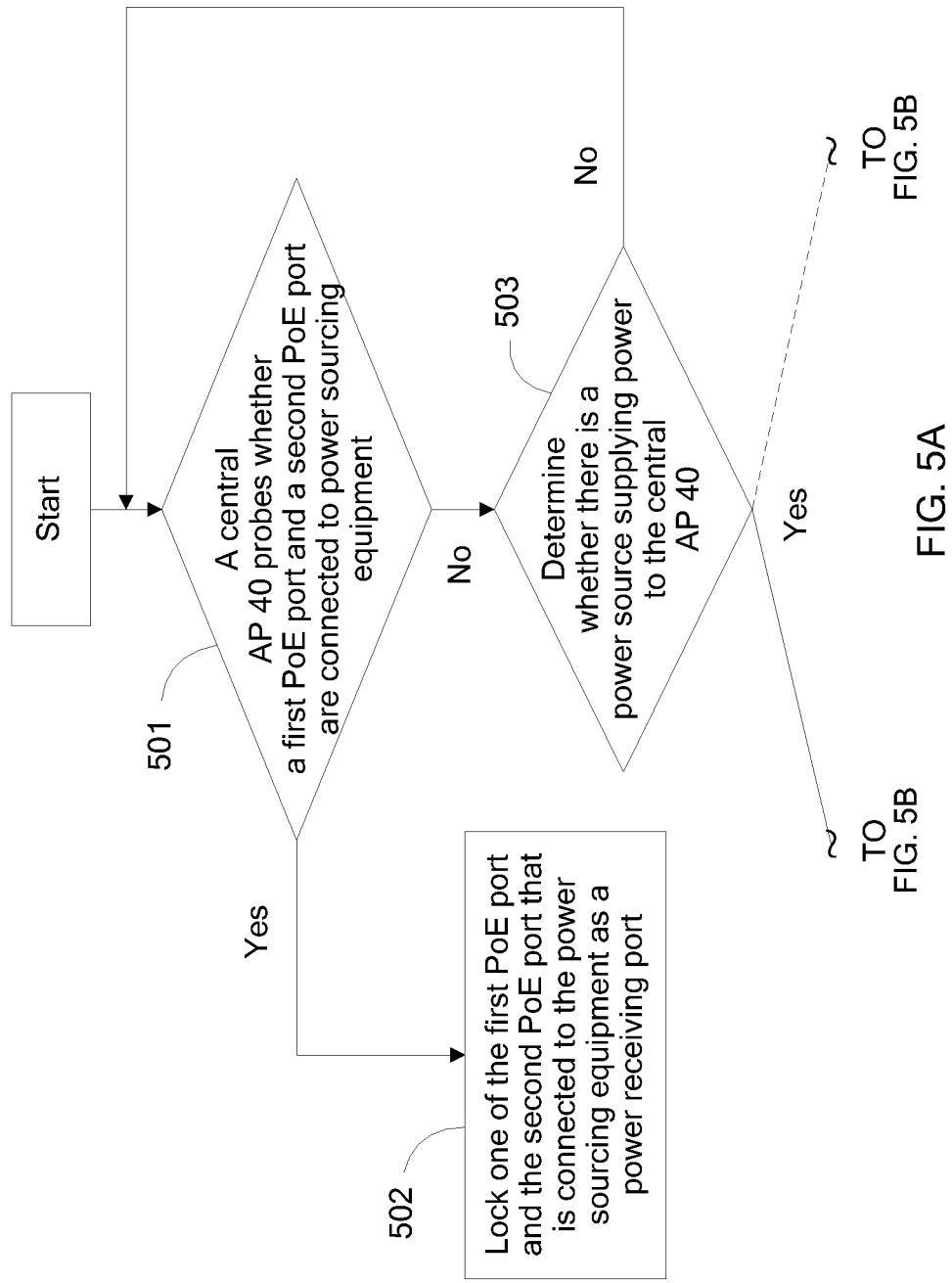
FIG. 5A and FIG. 5B are a flowchart of a port adaptation method according to an embodiment of the present invention.
Figure 5B:
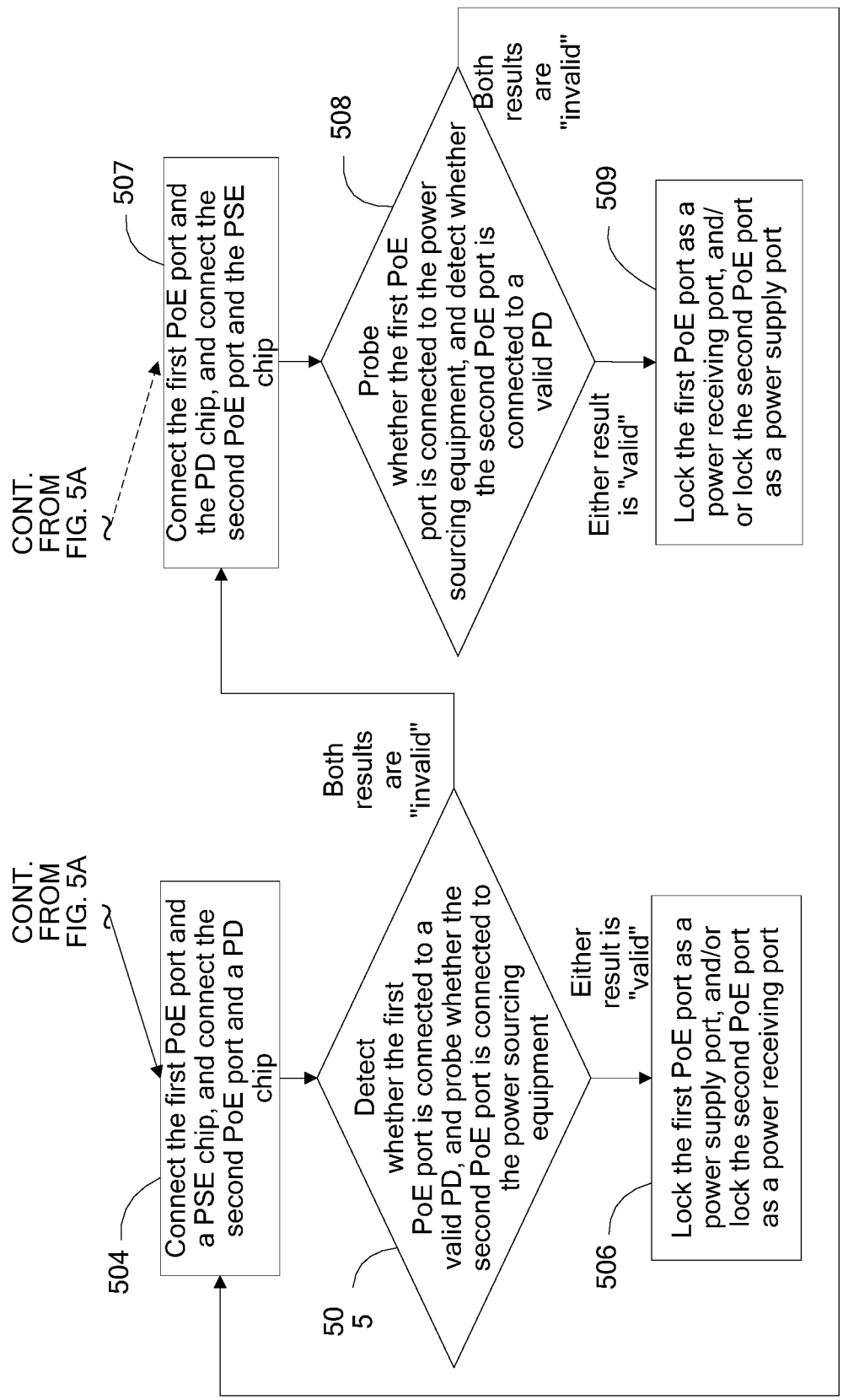

As shown in FIG. 4, the PoE port 401 is connected to the switch 41, and the PoE port 402 is connected to the distributed AP 42. The central AP 40 performs a port adaptation method (as shown in FIG. 5A and FIG. 5B) provided in an embodiment of the present invention, so that a PoE port adaptively becomes a power sourcing port or a power extraction port. In this way, the central AP serves as both a PD that extracts power from the switch and PSE that supplies power to the distributed AP.

In FIG. 4, a PSE port on which the switch 41 is connected to the central AP 40 is the power sourcing port, and represents a port directly connected to the PSE chip. A PD port on which the distributed AP 42 is connected to the central AP 40 is the power extraction port, and represents a port directly connected to the PD chip. In a specific implementation, the switch 41 may further include an adaptive PoE port and the port adaptation apparatus shown in FIG. 3. The distributed AP 42 may further include an adaptive PoE port and the port adaptation apparatus shown in FIG. 3. The central AP 4o may further include a power sourcing port directly connected to the PSE chip and a power extraction port directly connected to the PD chip.

Referring to FIG. 5A and FIG. 5B, a port adaptation method provided in an embodiment of the present invention includes the following steps.

Step 501: A PoE device 10 probes whether a first PoE port and a second PoE port on the PoE device 10 are connected to power sourcing equipment.

The first PoE port and the second PoE port are connected to a same port adaptation apparatus of the PoE device 10. The first PoE port and the second PoE port may be configured as a port group.

In a first case, both the first PoE port and the second PoE port are in a disconnected state, that is, neither the first PoE port nor the second PoE port is connected to a PSE chip or a PD chip. There may or may not be a power source supplying power to the PoE device 10. In this case, regardless of whether there is a power source supplying power to the PoE device 10, because both the first PoE port and the second PoE port are in the disconnected state, the PoE device 10 synchronously probes whether the first PoE port and the second PoE port are connected to power sourcing equipment.

For example, if both the first PoE port and the second PoE port are in the disconnected state by default at delivery of the PoE device 10, the PoE device 10 is in the first case at an initial moment.

For another example, if the first PoE port and the second PoE port return to the disconnected state after the PoE device 10 is faulty, the PoE device 10 performs step 501 to synchronously probe whether the first PoE port and the second PoE port are connected to power sourcing equipment.

In a second case, the first PoE port and the second PoE port are separately connected to a PSE chip and a PD chip, and there is no power source supplying power to the PoE device 10. In this case, because there is no power source supplying power to the PoE device 10, the PoE device 10 synchronously probes whether the first PoE port and the second PoE port are connected to power sourcing equipment.

For example, the first PoE port and the second PoE port are separately connected to a PSE chip and a PD chip at delivery of the PoE device 10. When the PoE device 10 is just deployed, there is no power source supplying power to the PoE device 10. In this case, the PoE device 10 performs step 501 to synchronously probe whether the first PoE port and the second PoE port are connected to power sourcing equipment.

For another example, there is previously a power source supplying power to the PoE device 10, and the first PoE port and the second PoE port have been separately connected to the PSE chip and the PD chip. However, no power source supplies power to the PoE device 10 later (possibly because an adapter power source cannot supply power, or previously connected power sourcing equipment cannot supply power). In this case, the PoE device 10 performs step 501 to synchronously probe whether the first PoE port and the second PoE port are connected to power sourcing equipment.

For a case in which the first PoE port and the second PoE port have been separately connected to the PSE chip and the PD chip, and there is a power source supplying power to the PoE device 10, it may be understood that step 504 or 507 is directly performed.

Specifically, the PoE device 10 probes whether there is a valid input voltage on the first PoE port. If there is the valid input voltage, it is considered that the first PoE port is connected to power sourcing equipment. Likewise, the PoE device 10 probes whether there is a valid input voltage on the second PoE port. If there is the valid input voltage, it is considered that the second PoE port is connected to power sourcing equipment.

The PoE device 10 may perform probing a plurality of times before probing that there is the valid input voltage on the first PoE port or the second PoE port.

For example, in FIG. 4, the central AP 40 is the PoE device 10, the PoE port 401 is the first PoE port, and the PoE port 402 is the second PoE port. At an initial moment at which a network is just deployed, the central AP 40 synchronously probes whether the PoE port 401 and the PoE port 402 are connected to power sourcing equipment.

If the PoE port 401 and/or the PoE port 402 are/is connected to power sourcing equipment (that is, it is probed that the first PoE port and/or the second PoE port are/is connected to power sourcing equipment), step 502 continues to be performed. If neither the PoE port 401 nor the PoE port 402 is connected to power sourcing equipment (that is, it is probed that neither the first PoE port nor the second PoE port is connected to the power sourcing equipment), step 503 continues to be performed.

Step 502: Lock powered port one of the first PoE port and the second PoE port that is connected to the power sourcing equipment as a powered port.

The other port may be directly locked as a power sourcing port, or may be locked as a power sourcing port after it is detected that the other port is connected to a valid PD.

If the PoE device 10 probes that the first PoE port is connected to the power sourcing equipment, the PoE device 10 connects the first PoE port and the PD chip, connects the second PoE port and the PSE chip, and locks the first PoE port as the powered port. If the PoE device 10 probes that the second PoE port is connected to the power sourcing equipment, the PoE device 10 controls the second PoE port to connect to the PD chip, controls the first PoE port to connect to the PSE chip, and locks the second PoE port as the powered port.

If it is simultaneously probed that both the first PoE port and the second PoE port are connected to the power sourcing equipment, it may be determined, according to a preset rule (for example, in a random manner or in an order of port numbers), that it is probed that the first PoE port is connected to the power sourcing equipment, or it is probed that the second PoE port is connected to the power sourcing equipment. For example, the preset rule is ascending order of port numbers. When it is simultaneously probed that both the first PoE port and the second PoE port are connected to the power sourcing equipment, it is determined, according to the preset rule, that it is probed that the first PoE port with a smaller port number is connected to the power sourcing equipment. A subsequent processing process is as described above.

FIG. 4 is used as an example. After working, the switch 41 outputs power to (for example, sends a detection voltage to, powers on, or supplies power to) the PoE port 401. The distributed AP 42 is a powered device, and does not output power to the PoE port 402. Therefore, the central AP 40 first probes that the PoE port 401 is connected to the power sourcing equipment. According to a probing result, the central AP 40 (specifically, the port adaptation apparatus 410) connects the PoE port 401 and a PD chip 412-2, connects the PoE port 402 and a PSE chip 412-1, and locks the PoE port 401 as a power extraction port. Then, the PoE port 401 accepts power supplied by the connected power sourcing equipment (that is, the switch 41). In other words, the PD chip 412-2 extracts power from the switch 41, and supplies power to the central AP 40. After the central AP 40 obtains the power from the switch 41 by using the PoE port 401, other components in the central AP 40 such as a processor, a WLAN chip, and the PSE chip 412-1 may work. The PSE chip 412-1 may detect the PoE port 402 and supply power to the PoE port 402, to supply power to the distributed AP 42. In this way, according to the connected devices, one of the PoE port 401 and the PoE port 402 adaptively serves as the powered port, and the other port serves as the power sourcing port.

Step 503: Determine whether there is a power source supplying power to the PoE device 10.

Specifically, if the PoE device 10 neither probes that the first PoE port is connected to the power sourcing equipment nor probes that the second PoE port is connected to the power sourcing equipment, it is determined whether there is the power source supplying power to the PoE device 10.

If there is no power source supplying power to the PoE device 10, the PoE device 10 continues to probe whether the first PoE port and the second PoE port are connected to the power sourcing equipment, that is, returns to step 501.

If there is the power source supplying power to the PoE device 10, that is, there is the power source supplying power to the PoE device 10 in the first case, the PoE device 10 may select one of the first PoE port and the second PoE port to connect to the PSE chip, and the other port to connect to the PD chip. The PoE device 10 may select the first PoE port to connect to the PSE chip, and the second PoE port to connect to the PD chip, that is, perform step 504. Alternatively, the PoE device 10 may select the first PoE port to connect to the PD chip, and the second PoE port to connect to the PSE chip, that is, perform step 507.

FIG. 4 is still used as an example. If there is no power source (no adapter power source or PoE) supplying power to the central AP 40, if it is not probed that the PoE ports 401 and 402 are connected to the power sourcing equipment, the central AP 40 returns to step 501, to continue to probe whether the PoE ports 401 and 402 are connected to the power sourcing equipment. If there is a power source supplying power to the central AP 40, the PSE chip 412-1 of the central AP 40 may work, and the central AP 40 may select one of the PoE ports 401 and 402 to connect to the PSE chip 412-1, and the other port to connect to the PD chip 412-2.

Step 504: The PoE device 10 connects the first PoE port and a PSE chip, and connects the second PoE port and a PD chip.

Step 505: The PoE device 10 detects whether the first PoE port is connected to a valid PD, and probes whether the second PoE port is connected to the power sourcing equipment. If there is the power source supplying power to the PoE device 10, the PoE device 10 may detect whether the first PoE port is connected to the valid PD, and probe whether the second PoE port is connected to the power sourcing equipment.

Step 506 is performed if either result is valid, that is, it is detected that the first PoE port is connected to the valid PD, or it is probed that the second PoE port is connected to the power sourcing equipment (three possible cases exist: In a first possible case, it is only detected that the first PoE port is connected to the valid PD, in a second possible case, it is only probed that the second PoE port is connected to the power sourcing equipment, and in a third possible case, it is detected that the first PoE port is connected to the valid PD and it is probed that the second PoE port is connected to the power sourcing equipment).

If both results are invalid, that is, it is detected that the first PoE port is not connected to the valid PD, and it is probed that the second PoE port is not connected to the power sourcing equipment, the PoE device 10 switches a state of the first PoE port and that of the second PoE port, that is, performs step 507. If a switching period is set, the PoE device 10 performs probing and detection according to the switching period, and switches the states of the ports after the switching period expires.

Step 506: The PoE device 10 locks the first PoE port as a power sourcing port, and/or locks the second PoE port as a powered port.

When the PoE device 10 detects that the first PoE port is connected to the valid PD, or probes that the second PoE port is connected to the power sourcing equipment (the foregoing three possible cases), the PoE device 10 keeps the first PoE port connected to the PSE chip, and the second PoE port connected to the PD chip, and the PoE device 10 locks the first PoE port as the power sourcing port, and/or locks the second PoE port as the powered port (that is, locks the first PoE port as the power sourcing port, or locks the second PoE port as the powered port, or locks the first PoE port as the power sourcing port and locks the second PoE port as the powered port). After a port is locked, a state of the port cannot be switched anymore.

After locking the first PoE port as the power sourcing port or locking the second PoE port as the powered port, the PoE device 10 may stop timing of the switching period.

Step 507: The PoE device 10 connects the first PoE port and the PD chip, and connects the second PoE port and the PSE chip.

Step 508: The PoE device 10 probes whether the first PoE port is connected to the power sourcing equipment, and detects whether the second PoE port is connected to a valid PD.

Step 509 is performed if either result is valid, that is, it is probed that the first PoE port is connected to the power sourcing equipment, or it is detected that the second PoE port is connected to the valid PD (three possible cases exist: In a first possible case, it is only probed that the first PoE port is connected to the power sourcing equipment, in a second possible case, it is only detected that the second PoE port is connected to the valid PD, and in a third possible case, it is probed that the first PoE port is connected to the power sourcing equipment and it is detected that the second PoE port is connected to the valid PD).

If both results are invalid, that is, it is probed that the first PoE port is not connected to the power sourcing equipment, and it is detected that the second PoE port is not connected to the valid PD, the PoE device 10 switches a state of the first PoE port and that of the second PoE port, that is, performs step 504. If a switching period is set, the PoE device 10 performs probing and detection according to the switching period, and performs switching after the switching period expires.

Step 509: The PoE device 10 locks the first PoE port as a powered port, and/or locks the second PoE port as a power sourcing port.

According to the port adaptation method provided in this embodiment of the present invention, when the PoE device is interconnected with another device, according to interconnected devices, one of the two PoE ports in the port group may adaptively become the power sourcing port, and the other port becomes the power extraction port, so that there is no need to manually distinguish between the ports to ensure accuracy of device interconnection.

In the embodiments of the present invention, PoE is used as an example to describe how one of two PoE ports in a PoE device adaptively serves as a power sourcing port and the other port serves as a power extraction port. The present invention is also applicable to a scenario in which a similar power supply technology such as Power over Data Lines (Power over Data lines, PoDL) is used. In the PoDL scenario, adaptive modifications, variations, or replacements that may be made for different protocols by a person skilled in the art based on the embodiments of the present invention shall also fall within the protection scope of the present invention.

A person of ordinary skill in the art may understand that all or a part of the steps of the method embodiments may be implemented by a program instructing relevant hardware. The corresponding program may be stored in a computer readable storage medium. The storage medium may be a random access memory, a read-only memory, a flash memory, a hard disk, a solid state drive, an optical disc, or the like.

The foregoing descriptions are merely example specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A port adaptation method, comprising:
probing, by a first voltage probe and a second voltage probe of a network device having a first port and a second port, whether the first port and the second port are connected to power sourcing equipment, wherein the first voltage probe is disposed in series between the first port and a first end of a switching switch of the network device, wherein the second voltage probe is disposed in series between the second port and the first end of the switching switch, and wherein the probing whether the first port and the second port are connected to the power sourcing equipment comprises detecting whether voltages at the first port and the second port are valid power over ethernet voltages during a switching period set by the network device; and performing at least one of:
  performing, by the switching switch, in response to the probing indicating that the first port is connected to power sourcing equipment:
    maintaining a state of the first port as a powered state or switching the state of the first port to the powered state;
    maintaining a state of the second port as a powering state or switching the state of the second port to the powering state; and
    locking the first port as a power extraction port; or
  performing, by the switching switch, in response to the probing indicating that the second port is connected to the power sourcing equipment:
    maintaining the state of the second port as the powered state or switching the state of the second port to the powered state;
    maintaining the state of the first port as the powering state or switching the state of the first port to the powering state; and
    locking the second port as a power extraction port.

2. The method according to claim 1, further comprising: identifying, in response to the probing indicating that both the first port and the second port are connected to the power sourcing equipment, that the probing indicates that only one of the first port or the second port is connected to the power sourcing equipment, wherein the identifying that the probing indicates that only one of the first port or the second port are connected is performed by the network device and according to a rule.

3. The method according to claim 1, further comprising: continuing, in response to the probing indicating that the first port and the second port are both not connected to the power sourcing equipment, and further in response to a power source not supplying power to the network device, the probing whether the first port and the second port are connected to the power sourcing equipment.

4. The method according to claim 1, further comprising: performing, by the network device, in response to the probing indicating that the first port and the second port are both not connected to the power sourcing equipment, and further in response to a power source supplying power to the network device, at least one of:
  setting the state of the first port to the powering state, and setting the state of the second port to the powered state; or
  setting the state of the first port to the powered state, and setting the state of the second port to the powering state.

5. The method according to claim 4, further comprising performing, after the switching the state of the first port to the powering state, and after switching the state of the second port to the powered state:
  detecting, by a power source equipment (PSE) chip connected to a second end of the switching switch of the network device, whether the first port is connected to a valid powered device;
  probing whether the second port is connected to the power sourcing equipment;
  performing, in response to the detecting indicating that the first port is connected to the valid powered device:
    maintaining the state of the first port as the powering state;
    maintaining the state of the second port as the powered state; and
    locking the first port as a power sourcing port; and
  performing, in response the probing indicating that the second port is connected to the power sourcing equipment:
    maintaining the state of the first port as the powering state;
    maintaining the state of the second port as the powered state; and
    locking the second port as the power extraction port.

6. The method according to claim 5, further comprising:
  performing, in response to detecting that the first port is not connected to the valid powered device, and further in response to the probing indicating that the second port is not connected to the power sourcing equipment:
    switching, by the network device, the state of the first port to the powered state; and
    switching the state of the second port to the powering state.

7. The method according to claim 4, further comprising performing, after the switching the state of the first port to the powered state, and after switching the state of the second port to the powering state:
  probing, by the network device, whether the first port is connected to the power sourcing equipment;
  detecting, by a power source equipment (PSE) chip connected to a second end of the switching switch of the network device, whether the second port is connected to a valid powered device;
  performing, in response to the probing indicating that the first port is connected to the power sourcing equipment:
    maintaining the state of the first port as the powered state;
    maintaining the state of the second port as the powering state; and
    locking the first port as the power extraction port; and
  performing, in response to detecting that the second port is connected to the valid powered device:
    maintaining the state of the second port as the powering state;
    maintaining the state of the first port as the powered state; and
    locking the second port as a power sourcing port.

8. The method according to claim 7, further comprising:
  performing, in response to detecting that the second port is not connected to the valid powered device, and further in response to the probing indicating that the first port is not connected to the power sourcing equipment:
  switching, by the network device, the state of the second port to the powered state; and
  switching the state of the first port to the powering state.

9. The method according to claim 1, further comprising wherein the method further comprises:
  performing, in response to the probing indicating that the first port is not connected to the power sourcing equipment within the switching period, and that the second port is connected to the power sourcing equipment within the switching period, and further in response to a power source supplying power to the network device, at least one of:
performing after the switching period expires:
switching, by the network device, the state of the first port to the powering state; and
switching the state of the second port to the powered state; or
performing after the switching period expires:
switching, by the network device, the state of the first port to the powered state; and
switching the state of the second port to the powering state.

10. The method according to claim 9, further comprising performing, after the switching the state of the first port to the powering state, and after switching the state of the second port to the powered state:
detecting, by a power source equipment (PSE) chip connected to a second end of the switching switch of the network device, whether the first port is connected to a valid powered device;
probing whether the second port is connected to the power sourcing equipment;
performing, in response to detecting that the first port is connected to the valid powered device:
maintaining the state of the first port as the powering state;
maintaining the state of the second port as the powered state; and
locking the first port as a power sourcing port; and
performing, in response to the probing indicating that the second port is connected to the power sourcing equipment:
maintaining the state of the first port as the powering state;
maintaining the state of the second port as the powered state; and
locking the second port as the power extraction port.

11. The method according to claim 10, further comprising:
performing, after the switching period expires, in response to detecting that the first port is not connected to the valid powered device within the switching period, and further in response to the probing indicating that the second port is not connected to the power sourcing equipment within the switching period:
switching, by the network device, the state of the first port to the powered state; and
switching the state of the second port to the powering state.

12. The method according to claim 9, further comprising performing, after the switching the state of the first port to the powered state, and after the switching the state of the second port to the powering state:
probing, by the network device, whether the first port is connected to the power sourcing equipment; and
detecting, by a power source equipment (PSE) chip connected to a second end of the switching switch of the network device, whether the second port is connected to a valid powered device;
performing, in response to the probing indicating that the first port is connected to the power sourcing equipment:
maintaining the state of the first port as the powered state;
maintaining the state of the second port as the powering state; and
locking the first port as the power extraction port; and
performing, in response to detecting that the second port is connected to the valid powered device:
maintaining the state of the second port as the powering state;
maintaining the state of the first port as the powered state; and
locking the second port as a power sourcing port.

13. The method according to claim 12, further comprising:
performing, in response to detecting that the second port is not connected to the valid powered device, and further in response to the probing indicating that the first port is not connected to the power sourcing equipment:
switching, by the network device, the state of the second port to the powered state;
and switching the state of the first port to the powering state.

14. A port adaptation apparatus, applied to a network device, the port adaptation apparatus comprising:
a power sourcing chip;
a powered chip; and
an adaptive module comprising a first voltage probe, a second voltage probe, and a switching switch, wherein the power sourcing chip is connected to a second end of the switching switch of the adaptive module, the powered chip is connected to the second end of the switching switch of the adaptive module, the adaptive module is connected to a first port and a second port on the network device, wherein the first voltage probe is disposed in series between the first port and a first end of a switching switch of the network device, wherein the second voltage probe is disposed in series between the second port and the first end of the switching switch, and wherein the adaptive module is configured to:
probe whether the first port and the second port are connected to power sourcing equipment by detecting, by the first voltage probe and second voltage probe whether voltages at the first port and the second port are valid power over ethernet voltages during a switching period set by the network device; and
perform at least one of:
perform, by the switching switch, in response to the probing indicating that the first port is connected to power sourcing equipment:
maintain a state of the first port as a powered state or switching the state of the first port to the powered state;
maintain a state of the second port as a powering state or switching the state of the second port to the powering state; and
lock the first port as a power extraction port; or
perform, by the switching switch, in response to the probing indicating that the second port is connected to the power sourcing equipment:
maintain the state of the second port as the powered state or switching the state of the second port to the powered state;
maintain the state of the first port as the powering state or switching the state of the first port to the powering state; and
lock the second port as a power extraction port.

15. The apparatus according to claim 14, wherein the adaptive module is further configured to:

identifying, in response to the probing indicating that both the first port and the second port are connected to the power sourcing equipment, that the probing indicates that only one of the first port or the second port is connected to the power sourcing equipment, wherein the identifying that the probing indicates that only one of the first port or the second port are connected is performed by the network device and according to a rule.

16. The apparatus according to claim 14, wherein the adaptive module is further configured to:
continue, in response to the probing indicating that the first port and the second port are both not connected to the power sourcing equipment, and further in response to a power source not supplying power to the network device, to probe whether the first port and the second port are connected to the power sourcing equipment.

17. The apparatus according to claim 14, wherein the adaptive module is further configured to:
perform, in response to the probing indicating that the first port is not connected to the power sourcing equipment, and that the second port is not connected to the power sourcing equipment, and further in response to a power source supplying power to the network device, at least one of:
switch the state of the first port to the powering state, and switch the state of the second port to the powered state; or
switch the state of the first port to the powered state, and switch the state of the second port to the powering state.

18. The apparatus according to claim 17, wherein the power sourcing chip is configured to, after the switching the state of the first port to the powering state, and after the switching the state of the second port to the powered state, detect whether the first port is connected to a valid powered device and send the detected result to the adaptive module; and
wherein the adaptive module is further configured to:
probe whether the second port is connected to the power sourcing equipment;
perform in response the first port being connected to the valid powered device:
maintain the state of the first port as the powering state;
maintain the state of the second port as the powered state; and
lock the first port as a power sourcing port, and
perform, in response to that the second port being connected to the power sourcing equipment:
maintain the state of the first port as the powering state;
maintain the state of the second port as the powered state; and
lock the second port as the power extraction port.

19. The apparatus according to claim 18, wherein the adaptive module is further configured to:
perform, in response to that the first port not being connected to the valid powered device and further in response to the second port not being connected to the power sourcing equipment:
switch the state of the first port to the powered state; and
switch the state of the second port to the powering state.

20. The apparatus according to claim 14, wherein the adaptive module is further configured to:
performing, in response to the probe indicating that the first port is not connected to the power sourcing equipment within a switching period, and that the second port is connected to the power sourcing equipment within the switching period, and further in response to a power source supplying power to the network device, at least one of:
perform, after the switching period expires:
switch the state of the first port to the powering state; and
switch the state of the second port to the powered state; or
perform, after the switching period expires:
switch the state of the first port to the powered state; and
switch the state of the second port to the powering state.

* * * * *